Patented Aug. 22, 1933

1,923,684

UNITED STATES PATENT OFFICE 1,923,684

PROCESS OF MAKING FOOD PRODUCTS

Scott H. Perky, Batavia, N. Y.

No Drawing. Application August 26, 1929
Serial No. 388,633

6 Claims. (Cl. 99—10)

My invention relates to a food product and process of making same.

The principal object of my invention is to devise a food which may be thoroughly cooked or not as desired and which is characterized by a high degree of fragility and crispness in conjunction with a sufficient body for affording a desirable resistance to the teeth during mastication.

A further object is to devise a food product as above described which embodies the constituent elements of the fruit, vegetable, grain or other substance used in its manufacture, which possesses a light, porous texture in cross section that enhances its edibility, and which may be developed from one or a combination of two or more edibles into a variety of forms and shapes for any food purpose.

A further and more particular object is the production of a cereal food of the character described which is formed by a thorough blending of the components of several kinds of cereal grains, and especially a fusion of the elements comprised in the grains of wheat, barley, and oats, or a combination of any two of these grains, with a view of securing a complete cereal food, or any desired modification thereof.

A further object is the devising of a process for the manufacture of a food product having the above characteristics, which shall preserve and suitably blend the component elements of the edibles employed, and transform the same into a thoroughly cooked, palatable state, or any modification thereof, including non-cooking.

In its more general aspects, my invention comprehends the development of a food product from any of the edibles, whether fruits, grains, vegetables, or other foods, which is susceptible of reduction to a plastic state by suitable treatment in its native liquid or by the addition of other fluids or substances. The nature of the treatment is such that the natural flavors and nutriments of the original food are fully developed and retained in the finished product, which may be thoroughly cooked and may be eaten as such, or subjected to further heating in water, milk or other flavors for the purpose of seasoning or the satisfying of other table requirements. The product has a characteristic appearance and, being thoroughly dried, may be kept for long periods with safety.

For the purpose of illustration, my invention will be described as applied to the production of a cereal food and particularly to a product composed of three of the edible grains, but it will be distinctly understood that I do not desire to be so limited, for the invention, broadly considered, is applicable to a variety of foods, as will become more apparent hereinafter.

The present so-called breakfast foods of the ready-to-serve variety usually partake of the form of a granulated, shredded, or a flaked product. The internal structure of these foods, however, is such that when served with the usual liquids, they lose to a large degree their original crispness and firmness, and become more or less soft and mushy, with a consequent detraction from their desirability and edibility as a food, and also as a stimulating agent for the salivary glands.

A further objection to food of the character under discussion is their incompleteness and lack of variety as feeding stuffs in a technical sense, a condition arising from the fact that each food is made from one kind of cereal grain, usually either wheat, oats, barley, corn or rice. Since the edible grains are characterized by different chemical compositions, it follows that foods made therefrom will likewise differ, so that in any given case, a food produced from one kind of grain may be rich in proteins, but be low in the carbohydrates, while a food formed from another grain may have contrary or different characteristics. This insufficiency as an adequate food is inherent in a product from a single kind of grain and is independent of the character of the process used, for however treated, the final product must necessarily be inferior in certain essentials of a complete food.

According to my invention, a food product is formed which is not only free from the objections above noted, but which is characterized by a novel departure in respect of its form, glossy exterior and structure or texture. Whichever kind of food is selected for treatment, the resulting product will exhibit a characteristic internal structure when viewed in cross-section, being generally cellular or foraminous in appearance, or such a structure as is defined by a plurality of septa within the product that forms either continuous, or non-continuous holes through the product, or in given instances, the product may be simply hollow. Accordingly, the food is readily frangible, but not to the extent of destroying its firmness when chewed, the degree of firmness obviously depending upon the nature of the food and whether eaten as originally prepared according to my invention, or subsequently treated. Preferably, the food is formed in the shape of short stick lengths, but may have other forms such as disks, squares, and other geometrical or non-geometrical shapes, as desired, and is especially adaptable for use as soup sticks, croutons and similar products, aside from its normal use as a breakfast food. Other shapes may be devised for cakes, bread, cheese sticks and other edible products.

Any of the cereal grains may be used in the manufacture of my improved product, wheat being preferred if grains of a single kind are employed but it is contemplated that a blending of the constituent elements of several grains may be effected with a view of producing a more complete food. For this purpose a composition of wheat, barley and oat grains in some predetermined proportion is preferred, the constituent elements of which are thoroughly blended together so that the resulting product is of a homogeneous character. These grains while differing in amount and kind of food content, bear certain definite relations to each other in respect of nutritious values, wheat for example, possessing a high albuminoid and carbohydrate content, barley a relatively low albuminoid but a high carbohydrate content, with oats occupying an intermediate position between wheat and barley in point of albuminoid content, but possessing a relatively high oil content. However, so far as this phase of the invention is concerned, I do not desire to be restricted in the exact proportions used, nor to a food composed of all three grains, for it will be understood that, for certain purposes, grains of a single kind or a union of any two kinds of grains may produce a satisfactory food.

These and further objects of my invention will be set forth in the following specification and the novel means by which said objects are effectuated will be definitely pointed out in the claims.

For purpose of illustration, the treatment of wheat, oat and barley grains necessary to form my improved product will be described, but it will be understood that the same process may be applied to any of these grains, a combination of any two of the grains, or to any other edible grain from which it is desired to make a cereal food product, or to edibles in general the precise steps differing with particular foods. The above grains are first thoroughly cleaned in any approved manner for the purpose of removing all foreign substances and preparing the grains for their subsequent reduction. The grains are then given a preliminary softening sufficient to cause a flowing together of the component elements of the various grains under pressure, as hereinafter described. Any approved manner of effecting the softening may be adopted, but it has been ascertained that an adequate softening of the wheat and barley grains may be effected by a partial cooking thereof, either separately or with the two kinds of grains mixed together, while the oats may be soaked separately, or softened by a moist steaming.

At this stage, the grains, although somewhat softened, are still whole and they may be mixed together, i.e., the three kinds, either before or after the next step of the process, which is a curing or tempering treatment. This phase of the process removes a sufficient percentage of the moisture content of the partially cooked grains in order to prevent any excessive adherence thereof to the reduction rolls and it also possesses the practical advantage of softening and otherwise conditioning the grains for said rolls, for which a particular consistency is desired. The tempering also serves to render the grains more digestible.

Having been mixed together, the whole grains are next passed through a reduction machine which is composed either of one smooth roll and one roll having a plurality of circumferential grooves cut in the surface thereof, or of one smooth roll and one circumferentially and longitudinally grooved roll, or of two such grooved rolls or of two smooth rolls, provided with combs, or scrapers, for removing the product therefrom. It will be understood, however, that the details of the foregoing rolls have been set forth for purpose of illustration only, as the essence of this step in the process is the reduction of the whole grains, partially cooked and tempered, to a thoroughly mixed condition by a direct and single action. It is contemplated that these rolls shall be placed in contact, so that the grains passing therebetween are subjected to great pressure and may be forced and impacted into the grooves, from which they are removed by the scrapers. Reducing the grains according to this method not only effects a tearing and thorough mixing of the different kinds of grains, but also of the component parts of each grain, this result being achieved without any necessity for grinding which causes a separation and spreading out of the elements of the grains, as contrasted with a thorough mixing thereof.

In order to improve the consistency of the product, the mass as it is delivered from the reduction rolls may be passed again between a second pair of such rolls. This additional reduction renders the mass more coherent and elastic.

After reduction, the substance is moist and pliable and is stirred into boiling water to form a batter. This batter is then subjected to cooking for a predetermined period of time, preferably in a steam jacketed kettle, and during this operation the batter may be stirred slowly and continuously. This step of the process is a complete cooking treatment, transforming the elements of the various grains into a condition easily assimilable by the human system, serving to distribute the colloidal property of the grains embodied in the starch and gluten, throughout the mass, and softening and expanding the cellulose content of the grains. The batter so formed is to be regarded generally as a plastic reduction of the food from its original state, regardless of its nature.

After cooking, the batter is then beaten or whipped, either by a more rapid motion of the stirring paddles in the cooking kettle, or by removing it to another receptacle which is provided with a suitable stirring device. This stirring or whipping is designed to render the batter smooth and as the latter cools, it tends to become stiffer and more elastic, and pulls out more and more in resistance to the stirring or whipping device. In addition, the most important results of this phase of the process for the cereal grains, at least, are the imparting of a glossy appearance to the finished product and a whipping into, or impregnation of, the soft mass with bubbles of air, an action which helps to create the characteristic, light porous texture of the finished product. For certain foods, the whipping step of the product may be eliminated.

When the batter has reached a suitable consistency during the whipping treatment, it is subjected to pressure in a suitable container having perforations through which the soft batter is driven in the form of continuous rods or sticks. Grooves may be pressed crosswise of the rods or sticks at appropriate intervals, so that they will break up into uniform lengths during or after the drying and toasting steps, or they may be cut after the toasting step, or the rods may be broken up indiscriminately into pieces of different lengths. The formation of rods or sticks is suggested as being the preferred shapes, but it will be understood that other formations may be employed if desired.

The final steps of the process comprise a drying and toasting of the sticks, the latter for improving the flavor, but which may be omitted for certain foods. The plastic rods or sticks are placed in an oven and subjected on entrance to a temperature which is sufficiently high to dry their exterior with great rapidity to form a firm outer shell of substantially the same dimensions as the plastic stick and which temporarily encloses a mass which is still plastic, since it is as yet unaffected by the heat. The temperature is then reduced to effect a comparatively slow drying of the plastic interior which shrinks and draws towards the outer shell to form the characteristic, internal septa, or foraminous or simply hollow structure, as above described, a result which is greatly facilitated for certain foods by the batter whipping step of the process. The application of heat may be secured by varying the temperature while the product is held fixed in an oven, or by moving the product on a conveyor through successive heat zones having the desired temperatures. After drying the cereal product may be toasted to improve its flavor, the sticks broken into suitable lengths and packed.

A product made according to the foregoing process, is characterized by several novel features. The thorough mixing, effected by the reduction rolls, of the component parts of each and of all of the grains distributes the starch and gluten throughout the mass, so that the colloidal action of these elements in the presence of moisture renders the whole product gelatinous, and a uniform fusion of the elements of the original grains. This fact, together with the embodiment of air in the reduced and cooked mass during the whipping operation and the manner of dehydrating, results in a product which possesses not only an adequate body and certain desirable resistance to mastication, but also one possessing a high degree of crispness or fragility. These two, hitherto unreconcilable, properties are according to my invention embodied in a single product which is thoroughly cooked, and ready-to-serve, either dry, with butter, or with any of the usual liquids. In the latter case, the body of the product resists an absorption of the liquid used and therefrom does not become soggy but preserves its crispness.

It will be observed that the finished product is not a mere agglutination of the various cereal components, but that the original grains are first transformed into a gelatinous mass of uniform consistency and composition, and it is from this mass that the finished product is formed as rods, sticks, or other desired shapes. If the three kinds of grains are used, they are preferably mixed in the proportion of eight parts of wheat, four parts of oats, and two parts of barley, although this formula is to be regarded as suggestive only.

Regardless of whichever of the grains or of the edibles in general are employed, whether singly or in any combination, my improved food product will be characterized by a marked superiority in eating qualities, including flavor, crispness, and adequate body. If wheat, oat and barley grains are employed, the finished product will possess superior nutritive qualities, owing to its embodiment of the essentials necessary to a complete food. These factors comprise valuable mineral salts, the regulatory properties of bran, and the two main classes of feeding stuffs, namely the proteins and carbohydrates, all of the foregoing being combined in a product having a uniform consistency, appetizing and palatable qualities, and a capacity for being eaten without further preparation.

It will be particularly noted that, in the foregoing processing of the grains, the woody parts thereof, embodied in the bran and cellulose, are so thoroughly softened and expanded as to function with the greatest efficiency in aiding the progress of the food through the alimentary tract of the consumer. During the cooking steps of the process, the starches undergo a complete dextrinization which improves the digestibility of the product, but at no time does the temperature rise sufficiently high to destroy the vitamin content of the component cereal grains.

While I have shown one arrangement of steps in a process by which my improved product can be formed, it will be understood that the same are intended for illustration only and that many changes may be made therein without departing from the spirit of my invention and the scope of the appended claims.

I claim:

1. The process of preparing a food from wheat, barley and oat grains which consists in partly cooking the wheat and barley grains, softening the oat grains, mixing all of said grains while whole, reducing the assembly of grains to a thoroughly mixed mass, further and completely cooking said mass, shaping said mass into individual batter portions, subjecting said batter portions to a temperature sufficient to rapidly dry the exterior thereof to form a shell, leaving the interior in a plastic state, and then reducing said temperature to more slowly dry said interior and cause the same to shrink toward said shell.

2. The process of preparing a food from wheat, barley and oat grains which consists in softening the wheat and barley grains together, separately softening the oat grains, mixing all of said grains together while whole, reducing the assembly of grains to a thoroughly mixed mass, cooking said mass, shaping said mass into individual batter portions, subjecting said portions to a temperature sufficient to rapidly dry the exterior thereof to form a shell, leaving the interior in a plastic state, and then reducing said temperature to more slowly dry said interior and cause the same to shrink toward said shell.

3. The process of preparing a food from wheat, barley and oat grains which consists in partly cooking the wheat and barley grains together, separately softening the oat grains, mixing all of said grains together while whole, reducing the assembly of grains to a thoroughly mixed mass, further and completely cooking said mass, shaping said mass into individual batter portions, subjecting said portions to a temperature sufficient to rapidly dry the exterior thereof to form a shell, leaving the interior in a plastic state, and then reducing said temperature to more slowly dry said interior and cause the same to shrink toward said shell.

4. The process of preparing a food from wheat, barley and oat grains which consists in partly cooking the wheat and barley grains together, separately softening the oat grains, tempering and mixing all of said grains together while whole, reducing the assembly of grains so that the elements thereof will combine to form a thoroughly mixed mass, further and completely cooking said mass, shaping said mass into individual batter portions, subjecting said portions to a temperature sufficient to rapidly dry the exterior thereof to form a shell, leaving the interior in a plastic state, and then reducing said temperature to more slowly dry said interior and cause the same to shrink toward said shell.

5. The process of preparing a food from wheat, barley and oat grains which consists in partly cooking the wheat and barley grains, separately softening the oat grains, tempering and mixing all of said grains together while whole, reducing the assembly of grains so that the elements thereof will combine to form a thoroughly mixed mass, further and completely cooking said mass in an amount of water that can be absorbed thereby, shaping said mass into individual batter portions, subjecting said portions to a temperature sufficient to rapidly dry the exterior thereof to form a shell, leaving the interior in a plastic state, and then reducing said temperature to more slowly dry said interior and cause the same to shrink toward said shell.

6. The process of preparing a food from wheat, barley and oat grains which consists in softening each of said grains, mixing said grains while whole, reducing the assembly of grains to a thoroughly mixed mass, cooking said mass, whipping the batter mass to introduce air thereinto, shaping said whipped mass into individual batter portions, subjecting said portions to a temperature sufficient to rapidly dry the exterior thereof to form a shell, leaving the interior in a plastic state, and then reducing said temperature to more slowly dry said interior and cause the same to shrink toward said shell.

SCOTT H. PERKY.